United States Patent [19]

Takeuchi et al.

[11] 4,206,036

[45] Jun. 3, 1980

[54] HYDRODESULFURIZATION OF HYDROCARBON OIL WITH A CATALYST INCLUDING TITANIUM OXIDE

[75] Inventors: Masato Takeuchi, Katsuta; Shinpei Matsuda, Hitachi; Hideo Okada, Hitachi; Hiroshi Kawagoshi, Hitachi; Fumito Nakajima, Hitachi, all of Japan

[73] Assignee: Hitachi, Ltd., Japan

[21] Appl. No.: 938,365

[22] Filed: Aug. 31, 1978

[30] Foreign Application Priority Data

Sep. 2, 1977 [JP] Japan .............................. 52-104914
Sep. 7, 1977 [JP] Japan .............................. 52-106709

[51] Int. Cl.$^2$ ............................................ C10G 23/02
[52] U.S. Cl. ................................ 208/89; 208/216 R; 252/469
[58] Field of Search ............... 208/216 R, 216 PP, 89; 252/469

[56] References Cited

U.S. PATENT DOCUMENTS

| | | | |
|---|---|---|---|
| 2,799,661 | 7/1957 | DeRosset | 208/216 R |
| 3,415,634 | 12/1968 | Dent et al. | 48/214 A |
| 3,840,473 | 10/1974 | Beuther et al. | 208/216 R |
| 3,956,105 | 5/1976 | Conway | 208/216 R |
| 3,997,431 | 12/1976 | Beuther et al. | 208/216 R |
| 4,098,682 | 7/1978 | O'Hara | 208/216 R |

*Primary Examiner*—George Crasanakis
*Attorney, Agent, or Firm*—Craig and Antonelli

[57] ABSTRACT

Hydrocarbon oil containing sulfur compounds, for example, lighter petroleum fraction having a boiling point of not higher than 250° C. is hydrodesulfurized to less than 1 ppm with a hydrogenating gas containing 1 to 40% by volume of oxides of carbon ($CO_2$ and CO) in the presence of a catalyst comprising 3 to 40% by weight of at least one of molybdenum and tungsten, and 2 to 15% by weight of at least one of nickel and cobalt, the balance being titanium oxide. Product gas from steam reforming can be used as the hydrogenating gas.

15 Claims, 1 Drawing Figure

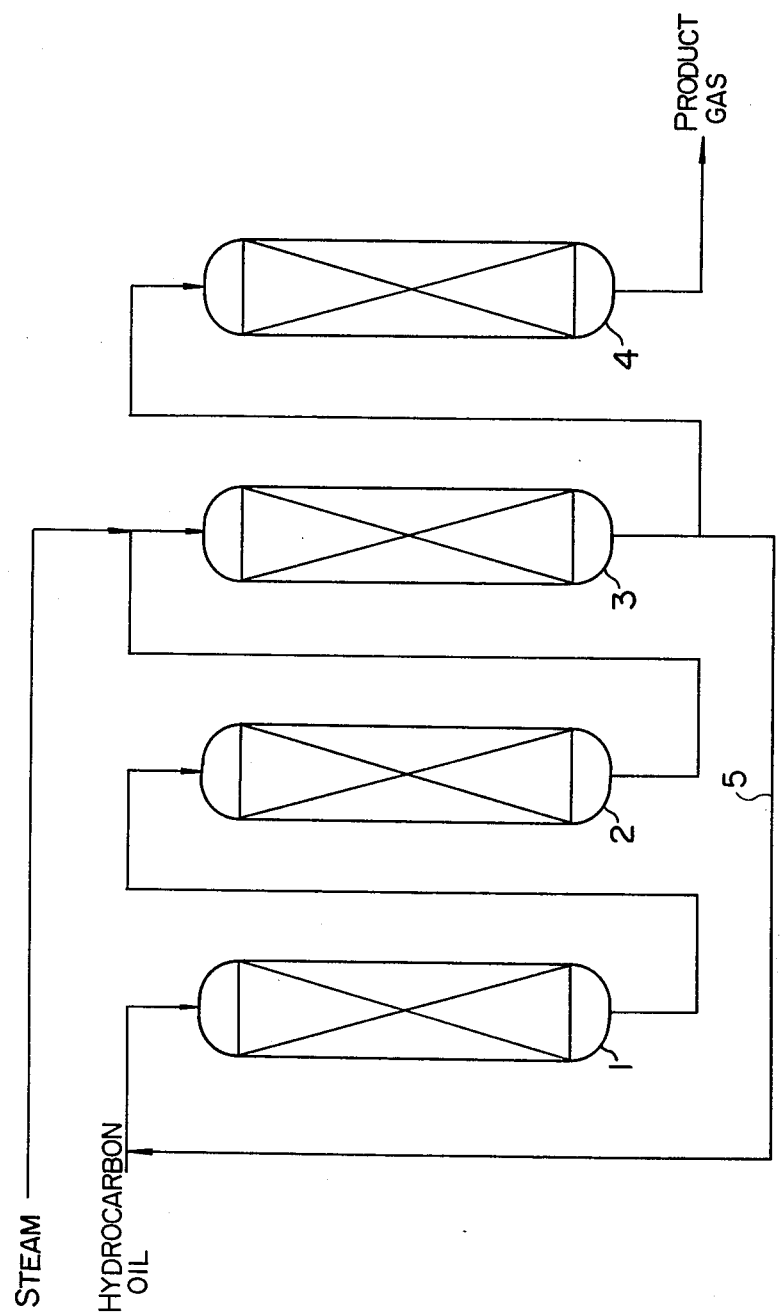

HYDRODESULFURIZATION OF HYDROCARBON OIL WITH A CATALYST INCLUDING TITANIUM OXIDE

This invention relates to a process for purifying hydrocarbon oil, and particularly to a process for purifying hydrocarbon oil through hydrodesulfurization by contacting the hydrocarbon oil containing sulfur compounds with a hydrogen-containing gas in the presence of a hydrodesulfurization catalyst, thereby converting the sulfur compounds to hydrogen sulfide, followed by removal of hydrogen sulfide. More particularly, the present invention relates to a process for purifying hydrocarbon oil through hydrodesulfurization by contacting the hydrocarbon containing sulfur compounds with a hydrogenating gas in the presence of a hydrodesulfurization catalyst comprising at least one of molybdenum and tungsten, at least one of nickel and cobalt, and titanium oxide, thereby converting the sulfur compounds to hydrogen sulfide, followed by removal of hydrogen sulfide.

The heretofore well known processes for purifying hydrocarbon oil containing sulfur compounds such as mercaptans, sulfides, disulfides, thiophenes, carbon disulfide, carbonyl sulfide, etc. are processes for purifying hydrocarbon oil by converting the sulfur compounds to hydrogen sulfide by means of pure hydrogen or a hydrogenating gas having a high hydrogen content in the presence of a hydrodesulfurization catalyst such as nickel-molybdenum-alumina (Nimox), cobalt-molybdenum-alumina (Comox), or nickel-cobalt-molybdenum-alumina (Nicomox), and successive removal of the resulting hydrogen sulfide by absorption on a solid absorbent such as zinc oxide or iron oxide (for example, British Pat. No. 1,068,588). However, in the processes for hydrodesulfurizing the sulfur compounds contained in the hydrocarbon oil by these well known hydrodesulfurization catalysts, these catalysts must be reduced with hydrogen and thoroughly sulfided to bring the catalyst components such as molybdenum, nickel or cobalt into the sulfide forms before using the catalysts. It has been known that without such a sulfidation treatment, the activity of the catalysts is much lower. That is, the well known hydrodesulfurization catalysts take such forms as $NiO—MoO_3—Al_2O_3$, $CoO—MoO_3—Al_2O_3$, and $NiO—CoO—MoO_3—Al_2O_3$ when prepared, and it is said that they then take such forms as $Ni—Mo—Al_2O_3$, $Co—Mo—Al_2O_3$, and $Ni—Co—Mo—Al_2O_3$ through the hydrogen reduction, though the reduction of $MoC_3$ to Mo metal is sometimes incomplete, and further they are sulfided, before putting them into use, to enhance the hydrodesulfurization activity.

Kinds and concentrations of sulfur compounds in the feedstock hydrocarbon oil, for example, lighter petroleum fraction, depend upon the origin of crude oil, or properties of crude oil fraction, and thus in order to obtain a high catalytic activity of the hydrodesulfurization catalyst, it is necessary to supply pure hydrogen or a hydrogenating gas having a high hydrogen content in large excess over the sulfur compound concentration of the feedstock hydrocarbon oil. On the other hand, when the sulfur compound concentration of the feedstock hydrocarbon oil is low, the sulfur in the sulfided hydrodesulfurization catalyst is also converted to hydrogen sulfide, liberated from the catalyst into the outgoing stream, whereby the hydrodesulfurizing activity tends to gradually decrease. Thus, when the sulfur compound concentration in the feedstock hydrocarbon oil is very low, it is necessary to supply sulfur compounds, for example, mercaptane, carbon disulfide at a predetermined rate together with the feedstock hydrocarbon to prevent the decrease in the hydrodesulfurization activity.

The hydrogenating gas for the hydrodesulfurization process is usually pure hydrogen or a hydrogenating gas having a high hydrogen content as described above, and the hydrogenating gas is usually prepared by a steam reforming reaction of lighter petroleum fractions. Thus, it will be advantageous, if a hydrogen-containing gas with a low purity, for example, the steam reformed gas without carbon dioxide removal, etc. can be used as the hydrogenating gas. That is, when the hydrogenating gas for the hydrodesulfurizing process comprises substantially hydrogen (that is, the gas contains a very small amount of CO and $CO_2$), the catalysts possess a high catalytic activity, whereas, when the hydrogenating gas is a gas, containing CO and $CO_2$ in considerable amounts, for example, a product gas from a low temperature steam reforming which typically contains 57% by volume of $CH_4$, 22% by volume of $H_2$, 20% by volume of $CO_2$, and 1% by volume of CO, the following problems appear.

The first problem is an occurrence of methanation reactions (1) and (2), resulting in elevation of reaction temperature and consumption of hydrogen necessary for the hydrogenation of the sulfur compounds.

$$CO + 3H_2 \rightarrow CH_4 + H_2O \ldots \quad (1)$$

$$CO_2 + 4H_2 \rightarrow CH_4 + 2H_2O \ldots \quad (2)$$

The second problem is a decrease in rate of hydrogenation of the sulfur compounds due to the presence of CO and $CO_2$.

Third problem is the aforementioned liberation of sulfur from the sulfided hydrodesulfurization catalyst into the outgoing gas stream when the sulfur compound concentration of the feedstock hydrocarbon oil is reduced to several ppm by weight, resulting in decrease in the catalytic activity.

To solve these problems, it has been proposed to use a catalyst comprising molybdenum and nickel supported on alumina (Japanese Patent Publication No. 14418/65) or a nickel catalyst in sulfided form (Japanese Patent Publication No. 40522/72). It seems that sulfided nickel-molybdenum-alumina catalysts are now industrially employed in the hydrodesulfurization of the lighter hydrocarbon oil, when the hydrogenating gas contains a large amount of CO and $CO_2$. However, such catalysts cannot solve the said second and third problems yet. Especially, the said third problem has so far solved, as already described above, by intentionally adding the sulfur compounds to the feedstock hydrocarbon oil, when the sulfur compound content of the feedstock is low, but such intentional additiin of the sulfur compounds complicates the operation.

As a result of extensive studies of the prior art from a viewpoint of developing a new hydrodesulfurization catalyst which possesses a high catalytic activity without the sulfidation treatment, the present inventors have discovered a catalyst having an epoch-making catalytic activity by using titanium oxide (titania) in place of alumina, and have established the present invention.

An object of the present invention is to provide a process for purifying hydrocarbon oil by hydrodesulfurizing sulfur compounds in the hydrocarbon oil with a good efficiency and good economy, overcoming said disadvantages of the prior art.

Another object of the present invention is to provide a process for producing a gas containing $CH_4$, $H_2$, CO and $CO_2$ by hydrodesulfurizing hydrocarbon containing sulfur compounds in the presence of a hydrodesulfurization catalyst comprising at least one of molybdenum and tungsten, at least one of nickel and cobalt, and titanium oxide, thereby converting the sulfur compounds to hydrogen sulfide and removing the hydrogen sulfide, and then steam reforming the resulting hydrocarbon oil. The gist of the present invention resides in efficient removal of the sulfur compounds in the hydrocarbon oil with a hydrogenating gas of low hydrogen purity containing oxides of carbon such as carbon dioxide and carbon monoxide in the presence of a novel hydrodesulfurization catalyst having a high activity and the resulting purification of the hydrocarbon oil. The hydrodesulfurization catalyst used in the present invention requires no sulfidation treatment beforehand, and exhibits a high activity only by hydrogen reduction beforehand. That is, the present invention has the following distinguished economical and process merits.

(a) When even a hydrogenating gas containing CO and $CO_2$ is used, no substantial methanation reaction takes place.

(b) Even if the hydrogenating gas contains a large amount of CO and $CO_2$, a liquid hourly space velocity (LHSV) of the feedstock hydrocarbon oil can be made higher.

(c) When the sulfur compound concentration of the feedstack hydrocarbon oil is low, the hydrodesulfurization activity of the present catalyst is not lowered.

(d) It is not necessary to sulfide the catalyst beforehand to increase the hydrodesulfurization activity of the catalyst.

One of the reasons why the present hydrodesulfurization catalyst has higher activity than the conventional catalysts based on alumina carrier is that nickel, cobalt, molybdenum and tungsten are activated with the interaction of titania, and consequently the present catalyst has a stronger absorption property to the sulfur compounds.

The present inventors have also made studies of the absorption of hydrogen sulfide by solid absorbents. By measuring hydrogen sulfide absorption capacity of $MoO_3$—$TiO_2$ and $MoO_3$—$Al_2O_3$ absorbant is has been found that $MoO_3$—$TiO_2$ absorbs $H_2S$ even at 150° C. (3 g of $H_2S$ is absorbed in 100 g of $MoO_3$—$TiO_2$ absorbant), whereas $MoO_3$—$Al_2O_3$ absorbent does not absorb $H_2S$ substantially. From this fact, it can be said that titania in the present catalyst is not only a mere carrier for nickel, cobalt, molybdenum and tungsten, but serves also as one of the catalytic components.

The feedstock hydrocarbon oil used in the present invention is not particularly limited, but includes mainly a lighter petroleum fraction to be supplied to steam reforming process for example, such petroleum fractions having a boiling point of less than 250° C., as naphtha, gasoline, kerosene, and light oil, and even heavy oil can be applied to the present invention. However, the present invention is particularly effective for the purification of feedstock hydrocarbon oil to processes requiring feedstocks containing the sulfur compounds in a very small amount, for example, the town gas production process and steam reforming process.

According to the present invention, hydrocarbon oil is generally hydrodesulfurized at a high temperature and a high pressure. More particularly, hydrocarbon oil containing a few ppm to a few hundred ppm by weight of sulfur compounds and a hydrogenating gas containing at least 5% by volume of hydrogen and 1 to about 40% by volume, usually about 25% by volume, of oxides of carbon (total of carbon monoxide and carbon dioxide) are supplied to a hydrodesulfurization reactor filled with the present catalyst at a ratio by mole of hydrogen to the hydrocarbon oil of 0.05–1.0:1, and subjected to hydrodesulfurization reaction at a reaction temperature of 200° to 500° C. and a reaction pressure of 2 to 300 atmospheres gauge to convert the sulfur compounds to hydrogen sulfide. The resulting hydrogen sulfide is removed from the outgoing stream by absorption in the succesive step, whereby purified hydrocarbon oil is obtained. According to the present invention, it is possible to reduce the content of residual sulfur compounds to 0.1 to 0.2 ppm by weight or less as sulfur in the purified hydrocarbon oil.

The most distinguished feature of the hydrodesulfurization catalyst used in the present invention is the use of titanium oxide (titania) as a main component, and titanium oxide further contains at least one of molybdenum and tungsten and at least one of nickel and cobalt each in the form of oxide when the catalyst is prepared. The present catalyst as prepared contains 3 to 40% by weight, preferably 5 to 20% by weight, of at least one molybdenum and tungsten as oxides, and 2 to 15% by weight, preferably 3 to 10% by weight, of at least one of nickel and cobalt as oxides, the balance being titanium oxide. The catalyst outside said range can show a considerably good activity, but when the content of nickel and/or cobalt as oxides is less than 2% by weight, the hydrodesulfurization activity is decreased, whereas, when the content exceeds 15% by weight, the cost of catalyst becomes higher. Especially when the content of nickel as oxide exceeds 20% by weight, methanation reaction is promoted thereby, and this is not preferable.

When the content of molybdenum and/or tungsten as oxides is less than 3% by weight, the hydrodesulfurization activity of the catalyst is lowered, whereas, when the content exceeds 40% by weight, the cost of the catalyst is disadvantageously increased, though there is little decrease in the catalytic activity. The balance of the catalyst is titanium oxide, as described above, but titanium oxide can be replaced with a small amount of refractory materials usually employed as a catalyst carrier, for example, alumina, silica, silica-alumina, diatomaceous earth, zirconia, magnesia, etc.

As titanium oxide raw materials for preparing the present catalyst, various types of titanium oxides, such as rutile type, anatase type, etc., and various titanium compounds capable of forming titanium oxide by heating, such as orthotitanic acid, metatitanic acid, titanium sulfate, etc. can be employed. Furthermore, various titanium compounds, such as titanium halides, for example, titanium tetrachloride and titanium trichloride, and titanium sulfate can be also employed by hydrolyzing the compounds by ammonia, aqua ammonia, water or steam to form hydroxides, and decomposing the hydroxides to oxides by heating. Other preferable titanium oxide raw material is a titanic acid slurry obtained by treating ilmenite ores with concentrated sulfuric acid, a precursor for rutile type or anatase type titanium oxide.

Furthermore, organic titanium compounds such as tetraisopropyl titanate, etc. can be also used. A commercially available titanium oxide is generally calcined at about 1,000° C., and has a specific surface area of not more than 1 m$^2$/g. Thus, as the titanium oxide contained in the present catalyst, those treated at a temperature higher than 700° C. for a considerably long time are not preferable. That is, the titanium oxide calcined at a temperature of not higher than 700° C., preferably not higher than 600° C., and having a specific surface area of 20 m$^2$/g or more is used in the catalyst of the present invention. That is, those calcined at 700° C. can have a specific surface area of at least 20 m$^2$/g, and those calcined at 600° C. can have a specific surface area of 40 to 50 m$^2$/g, and thus the titanium oxide calcined at 700° C. or lower or preferably at 600° C. or lower is used in the present invention.

On the other hand, as the molybdenum raw materials various compounds such as molybdenum oxide, molybdenic acid, ammonium paramolybdate, etc. can be used.

As the tungsten raw materials, various compound, such as tungsten oxide, tungstenic acid, ammonium paratungstate, etc. can be used.

As the nickel and cobalt raw materials, their various oxides, their various inorganic and organic compounds capable of forming their oxides by heating, such as hydroxides, nitrates, sulfates, chlorides, carbonates, formates, oxalates, etc. can be used. Furthermore, it is is possible to precipitate a hydroxide from an aqueous solution of any of their various compounds by aqua ammonia, caustic alkali, alkali carbonate, etc. and heat the resulting hydroxide to obtain an oxide. In the case that the catalyst is prepared by the impregnation method, nitrate of nickel or cobalt is a preferable raw material.

Method for preparing the present catalyst is not limited, and the present catalyst can be readily prepared according to the ordinary method utilized in the preparation of the ordinary catalyst, such as a mixing method, impregnation method, precipitation method, etc.

As a method for shaping of ultimate catalyst, any of the ordinary methods, such as an extrusion method, a tabletting method, a tumbling method, etc. can be used, depending upon the desired object.

The ultimate shape of catalyst can be any of spherical, cylindrical, rod, mass or other forms, and particle size of the ultimate catalyst depends upon the size of reactor, and the rate of hydrodesulfurizing the feedstock hydrocarbon oil, but an appropriate particle size ranges from about 1 to about 10 mm.

Calcination temperature of catalyst is 300° to 600° C. in view of service temperature of the catalyst, evaporation of molybdenum, and formation of said desired specific surface area of titanium oxide.

The catalyst components of the hydrodesulfurization catalyst of the present invention are in the forms of oxides when prepared, and thus are reduced with the hydrogen containing gas beforehand, and the temperature of reduction is 350° to 500° C.

The most remarkable advantages of the present invention using the present hydrodesulfurization catalyst comprising at least one of molybdenum and tungsten, at least one of nickel and cobalt, and the balance being titanium oxide are removal of sulfur compounds in hydrocarbon oil to such a very small content as 0.2 ppm by weight or lower by the present catalyst obtained only by the hydrogen reduction without further sulfidation treatment beforehand. Since no beforehand sulfidation is necessary for the present invention, no auxiliary facility and operation for supplying the sulfur compounds are required to prevent the decrease of the hydrodesulfurization activity of the catalyst as encountered when the feedstock hydrocarbon oil having a low sulfur compound concentration is hydrodesulfurized, as already described above, and thus the auxiliary facility can be saved in the hydrodesulfurization process. That is, the hydrodesulfurization process can be economically carried out with a simplified operation. However, sulfidation of the present catalyst beforehand is not objectionable, and sometimes can enhance the activity.

Another advantage obtained in the present invention is the use of a hydrogenating gas of low hydrogen purity containing oxides of carbon, methane, etc. That is, no auxiliary facility and operation for removing the oxides of carbon beforehand are required for using such a gas as the hydrogenating gas, and thus the hydrodesulfurization process is more economical with simplified steps.

The hydrogen content in the hydrogenating gas used in the present invention depends upon the properties of the feedstock hydrocarbon oils and various reaction conditions such as pressure and temperature, but satisfactory purification of hydrocarbon oil can be attained with a hydrogenating gas having a hydrogen content as low as about 5% by volume. However, if the hydrogen purity is too low, a required amount of the hydrogenating gas for the hydrocarbon oil is considerably increased, and the process will not be practical. Thus, it is preferable to use a hydrogenating gas containing at least 5% by volume of hydrogen.

When the hydrogenating gas contains oxides of carbon, a satisfactory purification has been hardly obtained using a presently available catalyst, since the oxides of carbon generally have an adverse effect upon the purification of hydrocarbon oil as already described above. The hydrodesulfurization catalysts applicable to such hydrogenating gas have been considerably limited, but the development of the present hydrodesulfurization catalyst has made various gases containing oxides of carbon, for example, lean gas, town gas, or gas called a rich gas, oxo syntehsis gas, methanol synthesis gas, etc. applicable to the hydrogenating gas. That is, hydrocarbon oil can be readily purified by reducing the sulfur compounds with a hydrogenating gas containing 1 to about 40% by volume of oxides of carbon in the present invention.

According to the result of detailed study made by the present inventors on thiophene, which is the most hardly hydrodesulfurizable organosulfur compound in the petroleum fraction, the effect of coexisting oxides of carbon upon the hydrodesulfurization is quite negligible, if the reaction pressure is more than 10 atmospheres gauge and the hydrogen content of the hydrogenating gas is 20% by volume. There exist many other sulfur compounds that are more readily hydrodesulfurized, for example, mercaptanes, sulfides, disulfides, etc. in the feedstock hydrocarbon oil than thiophene. Of course, those sulfur compounds are easily removed by the present catalysts.

According to the present invention, hydrodesulfurization can be carried out by using 0.05 to 1.0 mole, usually about 0.2 moles, of hydrogen per mole of the feedstock hydrocarbon oil without giving any appreciable influence upon the activity of the present hydrodesulfurization catalyst. If more than 1.0 mole of hydrogen is used, the amount of the hydrogenating gas to be recycled is increased, rendering the process uneconomical, whereas the hydrodesulfurization activity of the catalyst is lowered below 0.05 moles of hydrogen. When a hydrogenating gas of low hydrogen purity is used, it is preferable to use a molar amount of hydrogen as small as possible in said range to minimize the required amount of the hydrogenating gas.

The reaction temperature for carrying out the hydrodesulfurization depends upon the properties of the feedstock hydrocarbon oil, reaction pressure, etc., but is in a range of 200° to 500° C., preferably 250° to 450° C. It is also possible to carry out the hydrodesulfurization at a lower temperature than 200° C., so long as operating conditions for the hydrodesulfurization are appropriately selected, but the lower temperature is not always preferable also in view of the operating temperatures in the steps following the hydrodesulfurization. A carbon deposition trouble due to decomposition of hydrocarbon sometimes appears above 500° C., lowering the activity of hydrodesulfrization catalyst, whereas the activity of the catalyst will be also unsatisfactory below 200° C. Thus, the reaction temperature for the hydrodesulfurization must be in said range in the present invention.

In the present invention, the hydrodesulfurization is also carried out in a range of 2 to 300 atmospheres gauge, and it is also possible to obtain a considerably good result outside said pressure range. However, as the feedstock hydrocarbon oil becomes heavier, the sulfur compound concentration becomes higher, and an amount of hardly hydrodesulfurizable sulfur compounds will be also increased. In order to hydrodesulfurize such heavier feedstock, it is preferable to increase the reaction pressure. When the hydrogen purity of the hydrogenating gas is low, it is also preferable to increase the reaction pressure to prevent the influence of coexisting oxides of carbon.

A feed rate of the feedstock hydrocarbon oil for the hydrodesulfurization is not particularly limited in the present invention, but the feedstock can be thoroughly purified in a feed rate range of 0.5 to 20 h$^{-1}$ in terms of liquid hourly space velocity (LHSV). When the sulfur compounds in the feedstock include no thiophenes, it is possible to use an LHSV of 20 h$^{-1}$. The amount of the catalyst employed is increased, when the LHSV is below 0.5 h$^{-1}$, rendering the process uneconomical. In the present invention, a preferable LHSV is 0.5 to 7.0 h$^{-1}$.

Now, one embodiment of a process for producing a methane-rich town gas from hydrocarbon oil, based on the hydrodesulfurization, removal of resulting hydrogen sulfide from the hydrodesulfurized hydrocarbon oil, steam reforming of the purified hydrocarbon oil, and methanation of the resulting gas according to the present invention will be described, referring to the accompanying drawing.

The FIGURE is a schematic flow diagram showing a process for producing a town gas from feedstock hydrocarbon oil according to the present invention.

Steam reforming process for producing $CH_4$, $H_2$, $CO_2$ and CO from hydrocarbon oil by reaction with steam can be classified into two main types, i.e. a high temperature, external heating type and a low temperature, adiabatic type. In the high temperature, external heating type, the temperature at the outlet of steam reforming reactor is 650° to 800° C., and a product gas resulting from the steam reforming is rich in CO and $H_2$, whereas in the low temperature adiabatic type, the temperature at the inlet of steam reforming reactor is 350° to 500° C. and the temperature at the outlet thereof is 450° to 550° C., and the product gas from the steam reformer is rich in $CH_4$, and further contains $H_2$ and $CO_2$ and a small amount of CO. In said steam reforming of both low temperature and high temperature types, a catalyst of Ni system is employed, but, if sulfur is obtained in the feedstock hydrocarbon oil for the steam reforming, the catalyst is rapidly poisoned. That is, a desulfurization of the feedstock hydrocarbon oil is indispensable beforehand as a preliminary step for the steam reforming, preliminary step of the desulfurization consists of conversion of the sulfur compounds in the hydrocarbon oil to hydrogen sulfide by said hydrodesulfurization and successive removal of the resulting hydrogen sulfide by a solid absorbent (for example ZnO, $Fe_2O_3$, etc.), whereby the sulfur compound content of the hydrocarbon oil for the steam reforming is reduced to usually 1 ppm by weight or less, preferably to 0.5 ppm by weight, or less.

In the FIGURE, the feedstock hydrocarbon oil is mixed with a hydrogenating gas recycled through recycle line 5 from a product gas at the outlet of steam reformer 3, and the resulting mixture is led to hydrodesulfurizer 1, where the present catalyst is filled. Substantially all of the sulfur compounds in the feedstock hydrocarbon oil are converted to hydrogen sulfide through hydrodesulfurization reaction in hydrodesulfurizer 1. Outgoing gas from hydrodesulfurizer 1 is led to desulfurizer 2, where zinc oxide, iron oxide or the like is filled as a hydrogen sulfide absorbent. Outgoing gas from desulfurizer 2 is mixed with steam and led to steam reformer 3, where a nickel-alumina catalyst is filled, and $CH_4$, $H_2$, $CO_2$ and CO are formed through reaction of hydrocarbon oil with steam. A portion of the product gas from steam reformer 3 is recycled to hydrodesulfurizer 1 through recycle line 5. The remaining portion of the product gas is led to methanator 4, where a nickel-alumina catalyst is filled, and $CO_2$, CO and $H_2$ in the product gas are converted to methane to produce a methane-rich town gas.

Removal of hydrogen sulfide in desulfurizer 2 can be carried out according to any of the well known methods, for example, by the solid absorbent as ZnO, $Fe_2O_3$, CuO, etc., or by a wet removal with an aqueous alkaline solution or an aqueous amine solution. However, it is industrially more advantageous in the present invention to use said solid absorbent applicable at a high temperature and high pressure.

The hydrocarbon oil almost completely freed from the sulfur compounds is mixed with steam, and subjected to steam reforming reaction. The steam reforming reaction is carried out by external heating at an inlet temperature of 300° to 500° C. and an outlet temperature of 650° to 800° C., using a catalyst, for example, of nickel supported on $\alpha$-$Al_2O_3$, to produce hydrogen and carbon monoxide, but when a methane-rich gas such as a town gas is to be produced, the reaction is carried out adiabatically at a temperature of 400° to 550° C. and a pressure of 5 to 50 atmospheres gauge, where catalysts of high nickel content such as 40 to 85% by weight, for example Ni-$Al_2O_3$ (Japanese Patent Publication No. 17737/69), Ni-MgO (Japanese Laid-Open Patent Specification No. 76902/74), Ni-MgO-$Al_2O_3$ (Japanese Laid-open Patent Specification No. 105586/75), Ni-$La_2O_3$-$Al_2O_3$ (Japanese Patent Publication No. 11047/65), are used. The nickel catalyst for the steam reforming is also easily poisoned by sulfur, and thus the sulfur compound concentration of the feedstock hydrocarbon oil for the steam reforming must be not more than 1 ppm by weight at the inlet of steam reformer, as described before. Product gas from the steam reformer can be recycled as the hydrogenating gas for the hydrodesulfurization. Even if said methane-rich gas is produced, the product gas usually contains 10 to 30% by volume of hydrogen, and can be used as the hydrogenating gas. When hydrogen and carbon monoxide are produced by the high temperature steam reforming, the product gas usually contains more than 30% by volume of hydrogen, and thus can be used as the hydrogenating gas.

To convert the product gas from the low temperature steam reforming to a substitute natural gas containing more than 90% by volume of methane, a methanator shown in the FIG. as 4 is provided in succession to the steam reformer 3. The methanator can be provided at two stages in series. Alternatively, the product gas from the steam reformer is admixed with hydrocarbon oil, and then further subjected to steam reforming. The resulting product gas is then subjected to methanation in another methanator to increase a methane concentration. According to such procedure, the product gas can contain more than 90% by volume of methane after the removal of carbon dioxide therefrom.

Now, the present invention will be described in detail, referring to Examples.

Hydrodesulfurization test was conducted in the following manner in the following Examples 1 to 9 of hydrodesulfurization. The test apparatus is of a high pressureflow type of laboratory scale, and a feedstock oil was supplied to a stainless steel reactor tube having an inner diameter of 15 mm and a length of 1,000 mm, packed with 40 ml of a catalyst at the central part of the tube by a high pressure pump, and also a hydrogenating gas was supplied to the reactor tube from a high pressure cylinder. Outgoing gas from the reactor tube was led to an adsorber tube filled with a hydrogen sulfide absorbent. The absorber tube had an inner diameter of 30 mm and a length of 1,000 mm, and was filled with about 300 ml of commercially available zinc oxide (extruded granules, 4 mm in diameter) at its central part. The reactor tube and the absorber tube were externally heated with an electric furnace. Outgoing gas from the absorber tube was trapped in a cooler and separated into a liquid and a gas in a gas-liquid separator. The gas was vented to the atmosphere through a pressure regulator. To determine the efficiency of removing the sulfur compounds from the feedstock oil, the residual sulfur compounds in the liquid from the gas-liquid separator were analyzed by a gas chromatography with a flame photometric detector (FPD). To determine occurrence of methanation reaction, the gas was analyzed by a gas chromatography with a thermal conductivity detector (TCD).

EXAMPLE 1

379 g of titanium tetrachloride (TiCl$_4$) was dropwise added to about one l of distilled water slowly, and dissolved in it, and hydrolyzed with 5 N aqua ammonia. The resulting precipitates were thoroughly washed with distilled water, and admixed with a solution of 36.7 g of ammonium paramolybdate [(NH$_4$)$_6$Mo$_7$O$_{24}$.4H$_2$O] dissolved in distilled water with aid of hydrogen peroxide, and further with a solution of 38.9 g of nickel nitrate [Ni(NO$_3$)$_2$.6H$_2$O] dissolved in distilled water, and was thoroughly mixed therewith. The resulting slurry was dried, preliminarily calcined at 300° C. for two hours, admixed with 1% by weight of crystalline cellulose as a shaping agent, kneaded for about one hour, and shaped into moldings, 2.5 mm in diameter, by extrusion. The resulting moldings were dried, and then calcined at 500° C. for 5 hours.

The resulting catalyst comprised 15% by weight of molybdenum as MoO$_3$ and 5% by weight of nickel as NiO, the balance being titanium oxide.

The catalyst was filled in said reactor tube, and reduced by passing hydrogen through the reactor tube at a flow rate of about 1 l/min. at 450° C. for 5 hours. After the completion of reduction, a gas comprising 20.6% by volume of H$_2$, 1.13% by volume of CO, 21.1% by volume of CO$_2$ and 57.2% by volume of CH$_4$ was supplied to the reactor tube as a hydrogenating gas at a flow rate of 300 ml./min., whereas a synthetic feedstock prepared by adding 100 ppm by weight of thiophene as sulfur to n-hexane was passed through the reactor tube at a flow rate of 100 ml/hr. The feedstock was hydrodesulfurized through the catalyst bed, passed through the absorber tube (350° C., 10 atmospheres gauge), and separated into a gas and a liquid in the gas-liquid separator. The residual sulfur compound concentration of the liquid was analyzed by said gas chromatography, and it was found that the residual sulfur compound concentration was less than 0.1 ppm by weight as sulfur even after 100 hours.

On the other hand, a comparative catalyst comprising 15% by weight of molybdenum as MoO$_3$ and 5% by weight of nickel as NiO, the balance being alumina was prepared in the similar manner, and subjected to the hydrodesulfurization reaction in the same manner and conditions as above. It was found that the residual sulfur compound concentration in the liquid was 6.8 ppm by weight as sulfur after 3 hours.

EXAMPLE 2

The following three catalysts were prepared in the manner similar to that of Example 1.

(a) a catalyst comprising 15% by weight of molybdenum as MoO$_3$ and 5% by weight of cobalt as CoO, the balance being titanium oxide, (b) a catalyst comprising 15% by weight of molybdenum as MoO$_3$, 3% by weight of nickel as NiO, 2% by weight of cobalt as CoO, the balance being titanium oxide, and (c) a catalyst comprising 15% by weight of tungsten as WO$_3$ and 5% by weight of nickel as NiO, the balance being titanium oxide.

These three catalysts were subjected to the hydrodesulfurization reaction in the same manner and the same conditions as in Example 1, and it was found that the residual sulfur compound concentrations in the liquid were 0.18 ppm by weight, 0.1 ppm by weight, and 0.1 ppm by weight, respectively, as sulfur, after 10 hours.

EXAMPLE 3

A titanic acid slurry, a precursor for titanium oxide, obtained by treating ilmenite ores with hot concentrated sulfuric acid, was dried, and calcined at 500° C. for 5 hours, whereby titanium oxide powders were obtained. 1 kg of said titanium oxide powders was admixed with a solution of 173.2 g of ammonium paramolybdate dissolved in distilled water with aid of hydrogen peroxide and further with a solution of 137.5 g of nickel nitrate dissolved in distilled water, and thoroughly mixed and kneaded. The resulting slurry was then dried, and preliminarily calcined at 300° C. for two hours.

The resulting powders passing through 60-mesh sieve was molded to spheres, about 2.5 to 3.0 mm in diameter by tumbling method. The resulting spheres were dried, and calcined at 450° C. for 3 hours. The resulting catalyst comprises 12% by weight of molybdenum as $MoO_3$ and 3% by weight of nickel as NiO, the balance being titanium oxide.

The catalyst thus prepared was filled in said reactor tube, and reduced at 400° C. for 3 hours by passing hydrogen therethrough at a flow rate of about 1 l/min. After the completion of the reduction of catalyst, a gas comprising 11.7% by volume of $H_2$, 1.24% by volume of CO, 20.8% by volume of $CO_2$, and 66.3% by volume of $CH_4$ as a hydrogenating gas at a flow rate of 350 ml/min, and straight run naphth having an end boiling point of 113° C. and containing 185 ppm by weight of sulphur compounds as sulfur as a feedstock hydrocarbon oil at a flow rate of 250 ml/hr were passed through the reactor tube at 400° C. and 25 atmospheres gauge and subjected to hydrodesulfurization. It was found that the residual sulfur compound concentration as sulfur in the liquid was 0.16 ppm by weight after 100 hours.

EXAMPLE 4

The catalyst prepared in Example 3 was filled in the reactor tube, and reduced under the same conditions as in Example 3. Then, a gas comprising 67.7% by volume of $H_2$, 16.6% by volume of CO, 12.9% by volume of $CO_2$, and 2.80% by volume of $CH_4$ as a hydrogenating gas at a flow rate of 100 ml/min. and straight run naphtha having an end boiling point of 185° C. and containing 310 ppm by weight of sulfur compounds as sulfur at a flow rate of 120 ml/h was passed through the reactor tube at 350° C. and 25 atmospheres gauge, and subjected to hydrodesulfurization. It was found that the residual sulfur compound concentration as sulfur in the liquid was 0.21 ppm by weight after 100 hours.

EXAMPLE 5

The catalyst (b) comprising molybdenum, nickel, cobalt and titanium as oxides, prepared in Example 2 was filled in the reactor tube, and reduced under the same conditions as in Example 3. The gas used in Example 1 as the hydrogenating gas at a flow rate of 300 ml/min. and n-hexane containing 100 ppm by weight of ethyl sulfide as sulfur at a flow rate of 100 ml/hr were passed through the reactor tube at 250° C. and 15 atmospheres gauge and subjected to hydrodesulfurization. It was found that the residual sulfur compound concentration as sulfur in the liquid was 0.1 ppm by weight.

EXAMPLE 6

A slurry of titanic acid as a precursor for titanium oxide, nickel nitrate, cobalt nitrate, and ammonium molybdate were mixed and kneaded as raw materials for the catalyst, and then extruded into columnar pellets, 3 mm in diameter, through an extruder. The pellets were dried at 120° C. and calcined at 450° C. for two hours, whereby the following catalysts were obtained.

(A) Catalyst comprising 5% by weight of nickel as NiO and 12% by weight of molybdenum as $MoO_3$, the balance being $TiO_2$, (B) Catalyst comprising 5% by weight of CoO and 15% by weight of Mo as $MoO_3$, the balance being $TiO_2$, and (C) Catalyst comprising 3% by weight of Ni as NiO, 3% by weight of Co as CoO, and 15% by weight of Mo as $MoO_3$, the balance being $TiO_2$.

The catalysts each were filled in the individual reactor tubes and reduced at 500° C. for 2 hours by passing hydrogen therethrough at a flow rate of about 1 l/min.

Feedstock hydrocarbon oil used was desulfurized naphtha having an end boiling point of 110° C., to which thiophene was added to a concentration of 50 ppm by weight as sulfur. A hydrogenating gas comprising 55% by volume of $CH_4$, 22% by volume of $H_2$, 22% by volume of $CO_2$, and 1% by volume of CO was used. A molar ratio of $H_2$/naphtha was 0.25, LHSV of naphtha about 2.5 $h^{-1}$, and reaction pressure 27 atmospheres gauge.

Results are shown in Table 1. For comparison, the result obtained by using a commercially available $NiO—MoO_3—Al_2O_3$ catalyst (not sulfided) is given together in Table 1.

EXAMPLE 7

The same catalysts and comparative catalyst as in Example 6 were subjected to hydrodesulfurization under the same conditions as in Example 6, except that the catalysts were sulfided with a gas containing 36% by volume of $H_2S$ for 3 hours after the hydrogen reduction and the feedstock was supplied at LHSV of 5.0 $h^{-1}$. The results are shown in Table 2.

EXAMPLE 8

The same catalysts as in Example 6 were subjected to hydrodesulfurization under the same conditions as in Example 6, except that a hydrogenating gas comprising 70% by volume of $H_2$, 15% by volume of CO, 12% by volume of $CO_2$, and 3% by volume of $CH_4$ and naphtha having an end boiling point of 180° C. and a specific gravity of 0.697, to which 10 ppm by weight of thiophene as sulfur was added, as the feedstock hydrocarbon oil were used, the catalysts were sulfided beforehand, and the reaction pressure of 9 atmosphere gauge and feedstock LHSV of 5.0 $h^{-1}$ were employed. The results are shown in Table 3.

Table 1

| Catalyst (not sulfided) | | (A) | (B) | (C) | Comparative |
|---|---|---|---|---|---|
| Sulfur compound concentration in outgoing naphtha (ppm by weight as sulfur) | | | | | |
| | 350° C. | <0.2 | 0.3 | <0.2 | 1.2 |
| | 400° C. | <0.2 | <0.2 | <0.2 | 0.4 |
| Occurrence of methanation reaction (reduction in CO and $CO_2$ content) % | | | | | |
| | 350° C. | ≈0 | ≈0 | ≈0 | ≈0 |
| | 400° C. | 4 | ≈0 | ≈0 | 4 |

Table 2

| Catalyst (Sulfided) | (A) | (B) | (C) | Comparative |
|---|---|---|---|---|
| Sulfur compound concentration in outgoing naphtha (ppm by weight as sulfur) | | | | |
| 350° C. | <0.2 | <0.2 | <0.2 | 0.5 |

Table 2-continued

| Catalyst (Sulfided) | (A) | (B) | (C) | Comparative |
|---|---|---|---|---|
| 400° C. | <0.2 | <0.2 | <0.2 | <0.2 |

Note:
No occurrence of methanation reaction with any of the catalysts

Table 3

| Catalyst (sulfided) | (A) | (B) | (C) |
|---|---|---|---|
| Sulfur compound concentration in outgoing naphtha (ppm by weight as sulfur) | | | |
| 350° C. | <0.2 | 0.6 | <0.2 |
| 400° C. | <0.2 | <0.2 | <0.2 |

Note:
No occurrence of methanation reaction with any of the catalysts

EXAMPLE 9

A catalyst was prepared from spherical carriers of titanium oxide in the following manner.

Titanium oxide powders were molded to spherical granules according to a tumbling method, and calcined at 500° C. for 2 hours to obtain spherical carriers. The resulting spherical titanium oxide carriers had a specific surface area of 83 m$^2$/g (BET method) and a pore volume of 0.32 ml/g (mercury method). The titanium oxide carriers were impregnated in an aqueous solution of ammonium molybdate, and calcined at 300° C. for 2 hours, then further impregnated with an aqueous solution of nickel nitrate, dried, and calcined at 450° C. for two hours, whereby the hydrodesulfurization catalyst was obtained. The catalyst comprised 12.1% by weight of molybdenum as MoO$_3$ and 3.7% by weight of Ni as NiO, the balance being TiO$_2$.

The resulting catalyst was filled in the reactor tube, reduced with hydrogen and subjected to hydrodesulfurization under the same conditions as in Example 6. The sulfur compound concentrations in the liquid were less than 0.2 ppm by weight as sulfur at both 350° C. and 400° C., and no occurrence of methanation reaction was observed.

EXAMPLE 10

An example of low temperature steam reforming reaction is given in this example.

A steam reformer tube, 4.6 mm in inner diameter and 600 mm long, was filled with a catalyst crushed to 16-32 mesh at the central part of the tube to a length of about 300 mm (corresponding to about 5 ml of the catalyst). The steam reformer tube was wrapped with alumina cloth, about 5 cm thick, to make the reaction proceed as adiabatically as possible, and was heated externally by an electric furnace. Feedstock naphtha and water were led to preheaters by non-pulsating pressure pumps, vaporized and led to the steam reformer tube. A thermocouple was made to slide along the inside of a thermo well welded at the outer wall of the steam reformer tube to measure a temperature profile along the full length of the catalyst bed. Reaction end point was determined from the temperature profile, and a catalyst deterioration speed was determined from a change in the reaction end point with time.

Test conditions are given below:
Naphtha feed rate: 160 g/h
Water feed rate: 320 g/h
Linear velocity of naphtha: 980 g/cm$^2$.h
Inlet temperature: 450° C. (outlet temperature was 500° C.)
Reaction pressure: 24 atm gauge
Reaction time: 10 hours A Ni-Al$_2$O$_3$ catalyst containing 80% by weight of Ni as NiO, prepared according to coprecipitation method was used as the catalyst for the low temperature steam reforming.

When naphtha hydrodesulfurized with the catalyst (A) at 350° C. in Example 6 (see Table 1) was used, the catalyst deterioration speed was 4 mm/h, whereas when the naphtha hydrodesulfurized with the comparative catalyst in Example 6 at 350° C. (see Table 1, right end) was used, the catalyst deterioration speed was 9 mm/h.

As described above, the present invention provides a distinguished process for hydrodesulfurizing the sulfur compounds contained in hydrocarbon oil, and can be effectively applied not only to the hydrodesulfurization of the sulfur compounds in the hydrocarbon oil, but also to conversion of sulfur compounds in various gases to hydrogen sulfide.

What is claimed is:

1. A process for hydrodesulfurizing hydrocarbon oil which comprises contacting hydrocarbon oil containing sulfur compounds with a hydrogenating gas and a hydrodesulfurization catalyst thereby converting the sulfur compounds in the hydrocarbon oil to hydrogen sulfide, and removing the hydrogen sulfide from said hydrocarbon oil, said hydrodesulfurization catalyst comprising 45 to 95% by weight of titanium oxide, 3 to 40% by weight of at least one of molybdenum oxide and tungsten oxide, and 2 to 15% by weight of at least one of nickel oxide and cobalt oxide and said catalyst being subjected to hydrogen reduction without pre-sulfidation prior to being contacted by said hydrocarbon oil and said hydrogenating gas.

2. A process according to claim 1, wherein the hydrogenating gas contains 1 to 40% by volume of oxides of carbon.

3. A process according to claim 1, wherein the titanium oxide is calcined at a temperature of not higher than 700° C., and has a specific surface area of at least 20 m$^2$/g.

4. A process according to claim 1, wherein the hydrocarbon oil is contacted with the hydrogenating gas and the catalyst at a temperature of 200° to 500° C. and a pressure of 2 to 300 atmospheres gauge.

5. A process according to claim 1, wherein the hydrocarbon oil is supplied at a liquid hourly space velocity of 0.5 to 20 h$^{-1}$ at a molar ratio of hydrogen to the hydrocarbon oil of 0.05 to 1.0:1.

6. A process according to claim 1, wherein the hydrogenating gas is a recycle gas from product gas from the steam reforming of hydrocarbon oil.

7. A process according to claim 1, wherein the hydrocarbon oil is a light petroleum fraction having a boiling point of not higher than 250° C.

8. A process for producing a gas containing CH$_4$, H$_2$, CO$_2$ and CO which comprises contacting hydrocarbon oil containing sulfur compounds with a hydrogenating gas and a hydrodesulfurization catalyst, removing resulting hydrogen sulfide from said hydrocarbon oil mixing the hydrodesulfurized hydrocarbon oil with steam and reforming the hydrocarbon oil mixed with steam and a nickel-containing catalyst, the hydrodesulfurization catalyst comprising comprising 45 to 95% by weight of titanium oxide, 3 to 40% by weight of at least one of molybdenum oxide and tungsten oxide, and 2 to 15% by weight of at least one of nickel oxide and cobalt oxide, said catalyst and being subjected to hydrogen reduction without presulfiding before said catalyst is contacted with said hydrocarbon oil and said hydrogenating gas.

9. A process according to claim 8, wherein the hydrogenating gas contains 1 to 40% by volume of oxides of carbon.

10. A process according to claim 8, wherein the titanium oxide is calcined at a temperature of not higher than 700° C., and has a specific surface area of at least 20 m²/g.

11. A process according to claim 8, wherein the hydrocarbon oil is contacted with the hydrogenating gas and the catalyst at a temperature of 200° to 500° C. and a pressure of 2 to 300 atmospheres gauge.

12. A process according to claim 8, wherein the hydrocarbon oil is supplied at a liquid hourly space velocity of 0.5 to 20 h$^{-1}$ at a molar ratio of hydrogen to the hydrocarbon oil of 0.05 to 1.0:1.

13. A process according to claim 8, wherein the hydrogenating gas is a recycle gas from product gas from the steam reforming of hydrocarbon oil.

14. A process according to claim 8, wherein the hydrocarbon oil is a light petroleum fraction having a boiling point of not higher than 250° C.

15. A process according to claim 8, further comprising mixing the hydrocarbon oil containing sulfur compounds with a portion of a product gas produced by said reforming of the hydrocarbon oil mixed with steam.

* * * * *